(12) United States Patent
Ushiyama et al.

(10) Patent No.: US 8,598,818 B2
(45) Date of Patent: Dec. 3, 2013

(54) CONTROL DEVICE OF ELECTRIC MOTOR

(75) Inventors: Shigeyuki Ushiyama, Chino (JP);
Kaname Matsumoto, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 1475 days.

(21) Appl. No.: 11/191,933

(22) Filed: Jul. 29, 2005

(65) Prior Publication Data

US 2006/0022624 A1   Feb. 2, 2006

(30) Foreign Application Priority Data

Jul. 30, 2004  (JP) ................................ 2004-223623

(51) Int. Cl.
   *H02P 3/00*   (2006.01)
(52) U.S. Cl.
   USPC ....................................................... 318/275
(58) Field of Classification Search
   USPC ....................................................... 318/275
   See application file for complete search history.

(56) References Cited

U.S. PATENT DOCUMENTS

| 5,335,979 | A | * | 8/1994 | Naitou et al. ................. 303/191 |
| 5,349,276 | A | | 9/1994 | Mezzatesta, Jr. et al. |
| 5,481,460 | A | * | 1/1996 | Masaki et al. ................. 701/50 |
| 5,676,217 | A | * | 10/1997 | Torii et al. ..................... 180/179 |
| 5,691,611 | A | * | 11/1997 | Kojima et al. ........... 318/400.04 |
| 5,734,241 | A | | 3/1998 | Okada et al. |
| 7,122,979 | B2 | * | 10/2006 | Wilton et al. ............ 318/400.09 |
| 2003/0184152 | A1 | * | 10/2003 | Cikanek et al. ................ 303/152 |
| 2004/0108828 | A1 | * | 6/2004 | Jung ............................. 318/652 |

FOREIGN PATENT DOCUMENTS

| JP | 4-49881 | 2/1992 |
| JP | 2619390 | 3/1997 |
| JP | 11-235066 | 8/1999 |
| JP | 2000-23480 | 1/2000 |
| JP | 2002-223586 | 8/2002 |
| WO | WO 93/05454 | 3/1993 |

OTHER PUBLICATIONS

Chinese Patent Office Action issued in corresponding Chinese Patent Application No. 2005100873668.
Japanese Patent Office Action, mailed Mar. 11, 2008 and issued in corresponding Japanese Patent Application No. 2004-223623.
Extended European Search Report, mailed Aug. 8, 2008 and issued in corresponding European Patent Application No. 05015648.8-2207.

* cited by examiner

*Primary Examiner* — Robert Stevens
*Assistant Examiner* — Anil Bhargava
(74) *Attorney, Agent, or Firm* — Staas & Halsey LLP

(57) ABSTRACT

A control device for safely controlling an electrical motor during decelerating and stopping operations of the motor. The control device includes a control part for controlling the decelerating and stopping operations; a monitoring part for monitoring the operations of the electric motor; and a judging part for judging whether the velocity of the electric motor monitored by the monitoring part is abnormal while the control part controls the motor so as to decelerate and stop the motor. The judging part forcibly cuts off power to the electric motor, via a circuit breaker, when the judging part judges that the velocity of the motor is abnormal.

6 Claims, 6 Drawing Sheets ered by the monitoring part 16. The judging part 18 may send a power cut command to a circuit breaker 20 capable of forcibly cutting off power to the motor 12, when the judging part 18 judges that the velocity of the motor 12 is abnormal. In addition, as shown in FIG. 1, the control part 14 may control the motor 12 via a servo amplifier 22. Similarly, the breaker 20 may cut off the power to the motor 12 via the servo amplifier 22.

CONTROL DEVICE OF ELECTRIC MOTOR

BACKGROUND OF THE INVENTION

1. Field of the Invention

The present invention relates to a control device of an electrical motor.

2. Description of the Related Art

In the prior art, it has been considered to be safe for a control device of an electric motor to forcibly cut off power to the motor in order to stop the motor. This is because the risk of runaway of the motor is not completely eliminated when the motor is stopped without cutting off the power by, for example, a slowdown control, in which the power is continuously supplied to the motor.

In the above forcible cutting-off of the power, the runaway of an electric power system may be avoided. However, the stopping time of the motor becomes longer because the motor is driven by inertia after the cutting-off of the power. Accordingly, the stopping distance of a movable part driven by the motor, in a device or a system, also becomes longer.

SUMMARY OF THE INVENTION

An object of the present invention is to provide a control device for controlling an electric motor, when the motor is intended to decelerated and stopped, in order to resolve the above problem.

In order to achieve the object, the present invention provides a control device of an electrical motor, comprising: a control part for controlling decelerating and stopping operations; a monitoring part for monitoring the operations of the electric motor; and a judging part for judging whether the velocity of the electric motor monitored by the monitoring part is abnormal while the control part controls the motor so as to decelerate and stop the motor; wherein the judging part forcibly cuts off power to the electric motor via a circuit breaker when the judging part judges that the velocity of the motor is abnormal.

The monitoring part may monitor the velocity of the electric motor at a predetermined interval while the motor is decelerating, the judging part may judge that the velocity is abnormal when the velocity monitored by the monitoring part is not continuously decreasing.

Alternatively, the monitoring part may monitor the velocity of the electric motor after a predetermined time has passed from the beginning of deceleration of the motor, the judging part may judge that the velocity is abnormal when the velocity monitored by the monitoring part is equal to or larger than a predetermined threshold.

Alternatively, the monitoring part may monitor the velocity of the electric motor at a predetermined interval while the motor is decelerating and the judging part may judge whether the velocity is abnormal or not, based on a result of comparison between the velocity monitored by the monitoring part and a commanded velocity calculated at a predetermined interval for the motor.

The control device may include a plurality of the monitoring parts and a plurality of the judging parts each associated with each monitoring part. In this case, at least one of the judging parts forcibly cuts off power to the electric motor via the circuit breaker when the judging part judges that the velocity of the motor is abnormal.

It is preferable that the monitoring part or the judging part is activated by an emergency stop signal.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

The detail of the invention will be described below with reference to the drawings.

Figure 1:
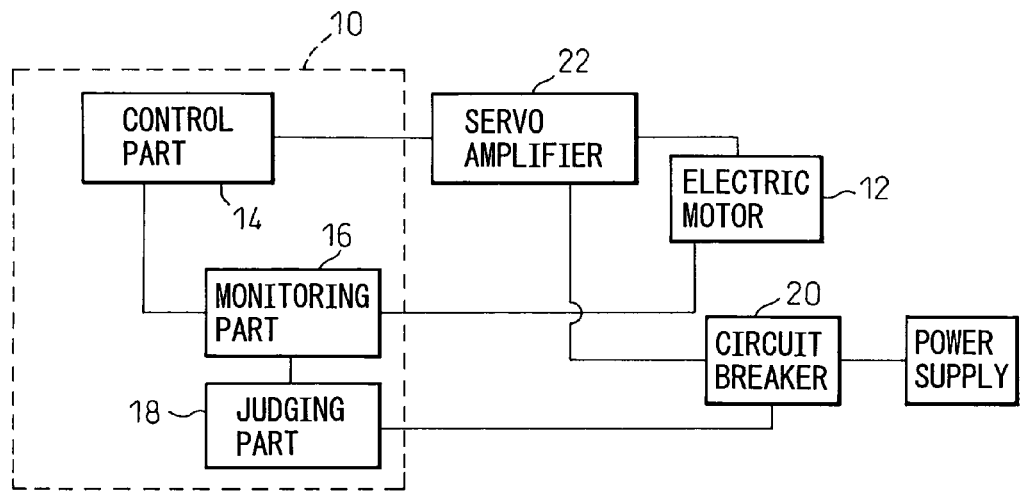
FIG. 1 shows a preferable configuration of a control device according to the invention.

FIG. 1 shows a preferable configuration of a control device 10 according to the invention. The control device 10 is a CNC device, for example, and includes a control part 14 for controlling decelerating and stopping operations of an electric motor 12, a monitoring part 16 for monitoring the operations of the motor 12, and a judging part 18 for judging whether the velocity of the motor 12 monitored by the monitoring part 16 is abnormal while the control part 14 controls the motor 12 so as to decelerate and stop the motor. The monitoring part 16 may monitor other parameters, such as torque and current, representing an operating state of the motor 12. The judging part 18 may send a power cut command to a circuit breaker 20 capable of forcibly cutting off power to the motor 12, when the judging part 18 judges that the velocity of the motor 12 is abnormal. In addition, as shown in FIG. 1, the control part 14 may control the motor 12 via a servo amplifier 22. Similarly, the breaker 20 may cut off the power to the motor 12 via the servo amplifier 22.

Figure 2:
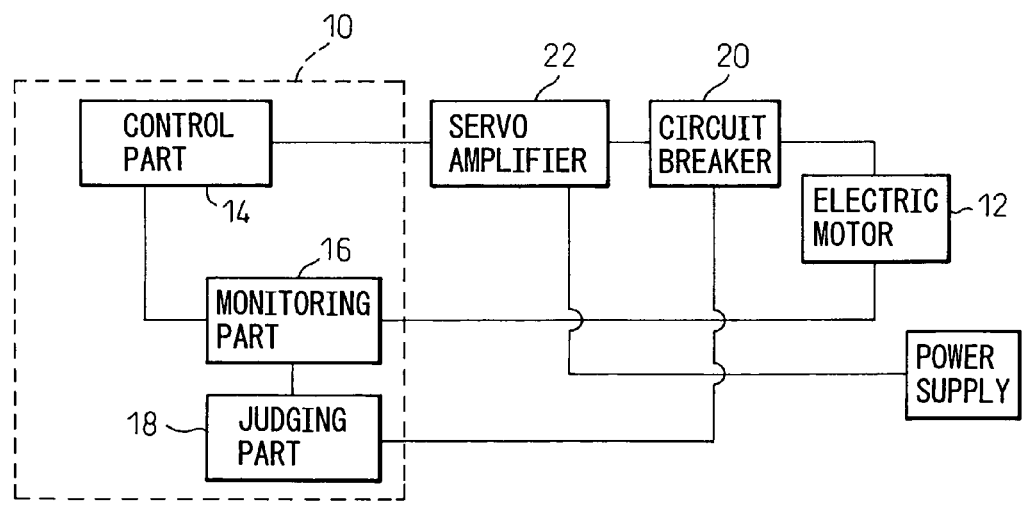
FIG. 2 shows another preferable configuration of a control device according to the invention.

FIG. 2 shows another preferable configuration of a control device according to the invention. This configuration is different from that of FIG. 1 in that the breaker 20 cuts off the power to the motor 12 without a servo amplifier being between them.

Figure 3:
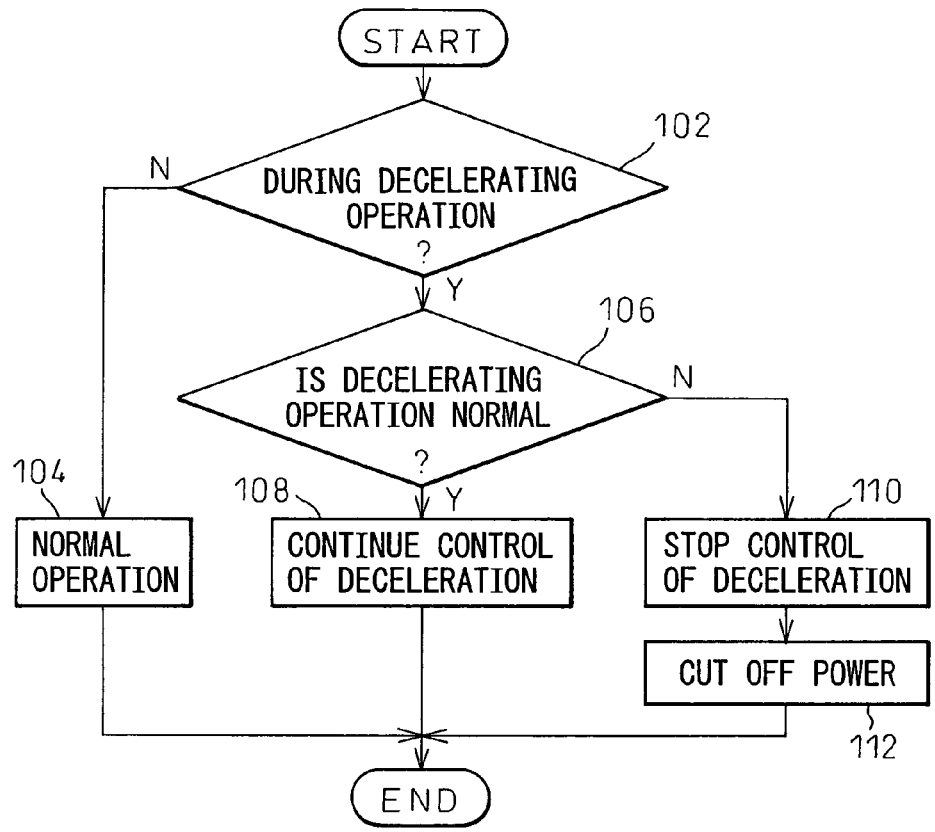
FIG. 3 is a flowchart showing a control way of an electric motor by using the control device of the invention.

FIG. 3 is a flowchart showing control of the electric motor 12 by using the control device 10. First, is step 102, it is judged whether the motor 12 is decelerating. If not, the motor 12 is normally operated (step 104) and the process terminates. While the motor 12 is decelerating, the process progresses to step 106 and the judging part 18 judges whether the decelerating operation or the velocity of the motor is abnormal or not, based on the velocity monitored by the monitoring part 16. When the decelerating is judged to be normal, the process progresses to step 108 and the control part 14 continues controlling the operation, then, the process terminates. On the other hand, if the velocity of the motor is judged to be abnormal in step 106, it should be considered that the decelerating operation includes some kind of problem. Therefore, the process progresses to step 110 for stopping the decelerating operation. Further, the process progresses to step 112 in which the circuit breaker 20 cuts off the power to the motor 12 and, then, the process terminates. The series of steps described above is repeated at a predetermined interval.

Figure 4:
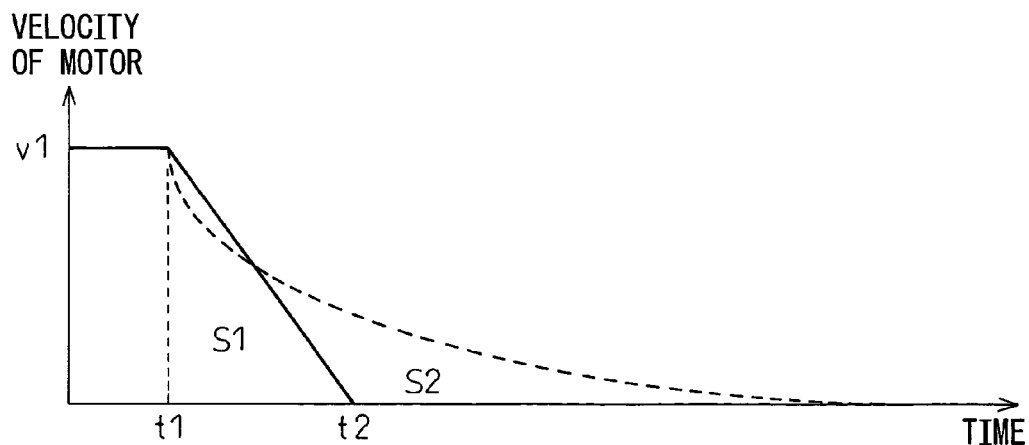
FIG. 4 is a graph indicating changes of the velocity of the motor without disorder during control of deceleration of the motor, using a solid line and a dashed line representing the invention and the prior art, respectively.
Figure 5:
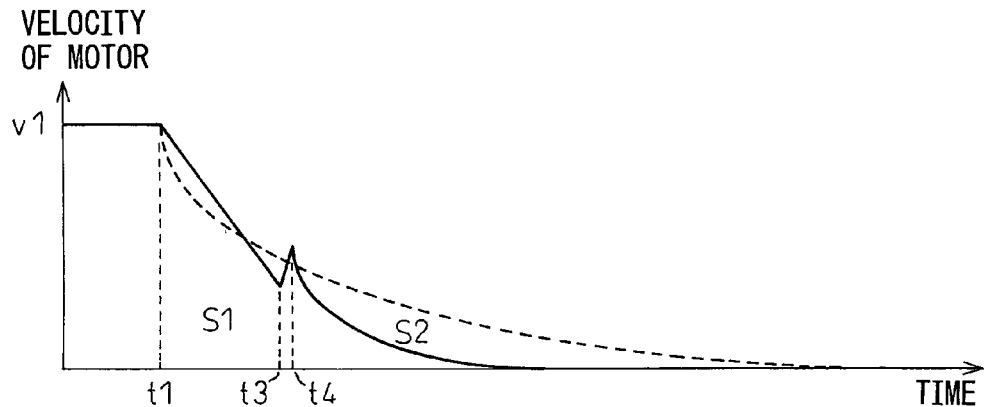
FIG. 5 is a graph, in relation to FIG. 4, indicating changes of the velocity of the motor with disorder during control of deceleration of the motor, using a solid line and a dashed line representing the invention and the prior art, respectively.

Next, the reason for reducing the stopping time and distance of the motor is explained. FIGS. 4 and 5 show the changes of the velocity of the motor during the decelerating operation by the control device or a control way of the invention, in comparison with that of the prior art. In particular, FIG. 4 corresponds to a case in which the velocity of the motor is judged to be normal (i.e., steps 106→108 in FIG. 3) and, FIG. 5 corresponds to a case in which the velocity of the motor is judged to be abnormal (i.e., steps 106→110→112 in FIG. 3).

First, when the velocity of the motor is normal, as shown in FIG. 4, the motor rotating at a constant velocity v1 is decelerated by the control part 14, from time t1, at a controlled deceleration rate (in this case a constant rate) and, then, is stopped at time t2. Therefore, the moving distance or the stopping distance of the motor from the beginning of the deceleration to the stoppage corresponds to an area S1 of a triangle defined by an x-axis, a straight line indicating x=t1 and a solid line of the graph. On the other hand, when the power to the motor is forcibly cut off, as shown by a dashed line, the velocity of the motor is rapidly decreased just after the power is cut off, however, the deceleration rate of the velocity is gradually lowered as time passes. The moving distance of the motor in the latter case corresponds to an area S2 of a figure defined by the x-axis, the straight line indicating x=t1 and a curved line (or the dashed line) of the graph. As shown, by setting the deceleration rate of the motor controlled by the control part 14 to a suitable value, the area S1 may be smaller than the area S2. Therefore, by using the control device of the invention, a stopping time of the electric motor and a stopping distance of a movable part of a device or a system driven by the electric motor may be shortened.

Next, as shown in FIG. 5, if a problem occurs at time t3 during the decelerating operation, the velocity of the motor may instantly increase, as shown by the solid line of the graph, as the power is supplied to the motor at time t3. However, as described concerning step 112 of FIG. 3, the judging part 18 activates the circuit breaker 20 upon recognizing the problem with the motor. Therefore, the velocity of the motor decreases after time t4 when the breaker 20 is activated. The change profile of the velocity of the motor after the breaker 20 is activated is generally the same as that of prior art (the dashed line) after time t1. Also in this case, therefore, the area S1 may be smaller than the area S2, whereby the stopping time of the motor and the stopping distance of the movable part driven by the motor may be shortened.

Figure 6:
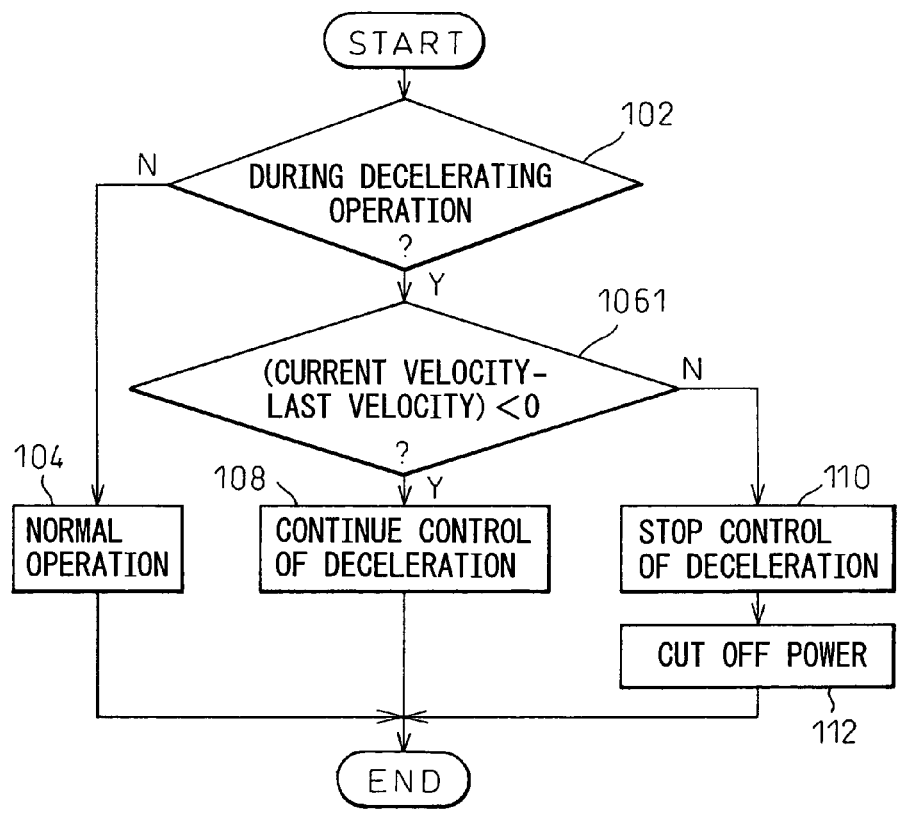
FIG. 6 is a flowchart, in relation to FIG. 3, showing steps of a first embodiment for judging whether the velocity of the motor is abnormal or not.

Regarding step 106, for judging whether the velocity of the motor during the decelerating operation is abnormal or not, some concrete methods may be possible. As a first example, in step 1061 shown in FIG. 6, the judging part 18 judges the velocity of the motor to be abnormal when the current velocity monitored by the monitoring part 16 is larger than the last velocity, whereby the process progresses to step 110. Contrarily, the judging part 18 judges the velocity of the motor to be normal when the current velocity is equal to or smaller than the last velocity, whereby the process progresses to step 108. In other words, in the example of FIG. 6, the condition, in which the velocity of the motor monitored at a predetermined interval always decreases or does not change, is judged to be normal. Other steps of FIG. 6 may be the same as the corresponding steps of FIG. 3.

Figure 7:
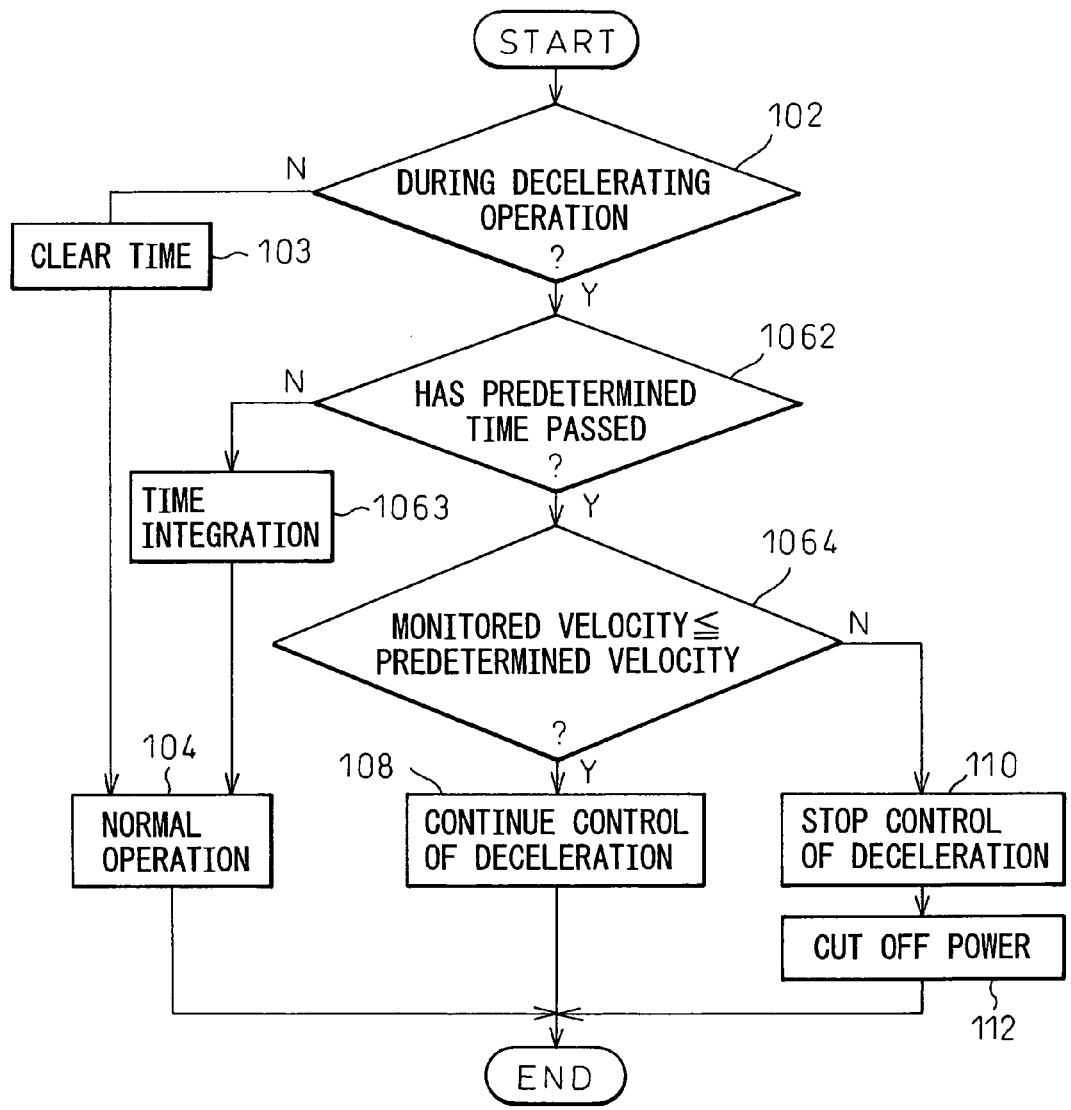
FIG. 7 is a flowchart, in relation to FIG. 3, showing steps of a second embodiment for judging whether the velocity of the motor is abnormal or not.

As a second example, in step 1062 shown in FIG. 7, the judging part 18 judges whether a predetermined time has passed or not. If the predetermined time has not passed yet, the process progresses to step 1063 for time-integration and then terminates. When the predetermined time has passed, the process progresses to step 1064 in which the judging part judges whether the velocity of the motor is equal to or smaller than a predetermined threshold. If yes, the velocity of the motor is judged to be normal and the process progresses to step 108. Contrarily, the judging part 18 judges the velocity of the motor to be abnormal when the velocity is larger than the threshold, whereby the process progresses to step 110. In other words, in the example of FIG. 7, the condition, in which the velocity of the motor after the predetermined time is equal to or smaller than the predetermined threshold, is judged to be normal. In the example, step 103 is inserted between steps 102 and 104 for clearing the integrated time in step 1063. Other steps of FIG. 7 may be the same as corresponding steps of FIG. 3.

Figure 8:
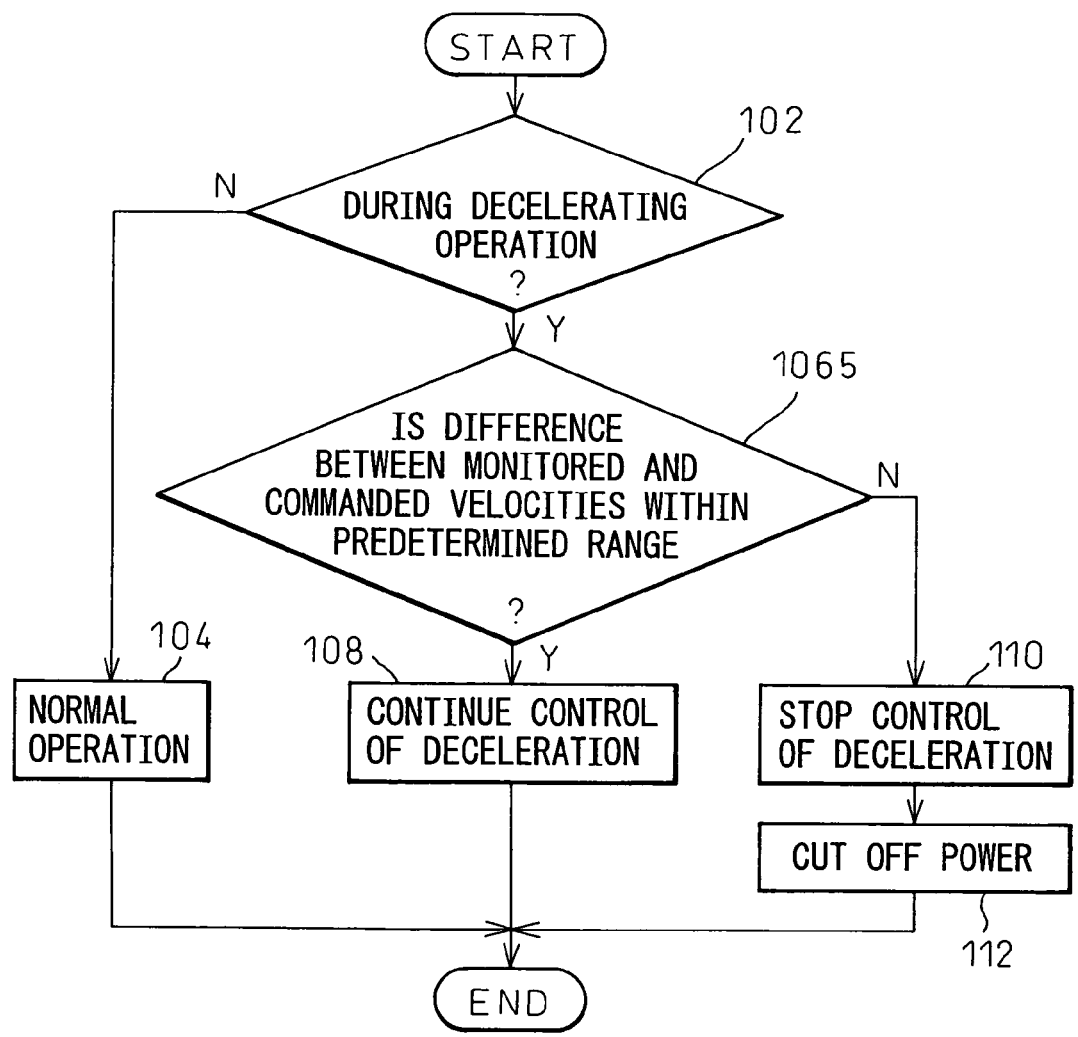
FIG. 8 is a flowchart, in relation to FIG. 3, showing steps of a third embodiment for judging whether the velocity of the motor is abnormal or not.

In a third example, the monitoring part 16 monitors the velocity of the motor during the decelerating operation at a predetermined interval. Further, the judging part 18 judges whether the velocity of the motor is abnormal, or not, based on a result of comparison between the velocity monitored by the monitoring part and a commanded velocity calculated at a predetermined interval for the motor. Concretely, in step 1065 shown in FIG. 8, the judging part 18 compares the real velocity monitored by the monitoring part 16 with a commanded decelerating velocity given to the motor. If the difference between the monitored velocity and the commanded velocity is not within a predetermined range, the velocity of the motor is judged to be abnormal and the process progresses to step 110 or, otherwise, to step 108. By repeating this series of steps at a predetermined interval, the monitored velocity is compared with the commanded velocity at the predetermined interval. Other steps of FIG. 8 may be the same as corresponding steps of FIG. 3.

Figure 9:
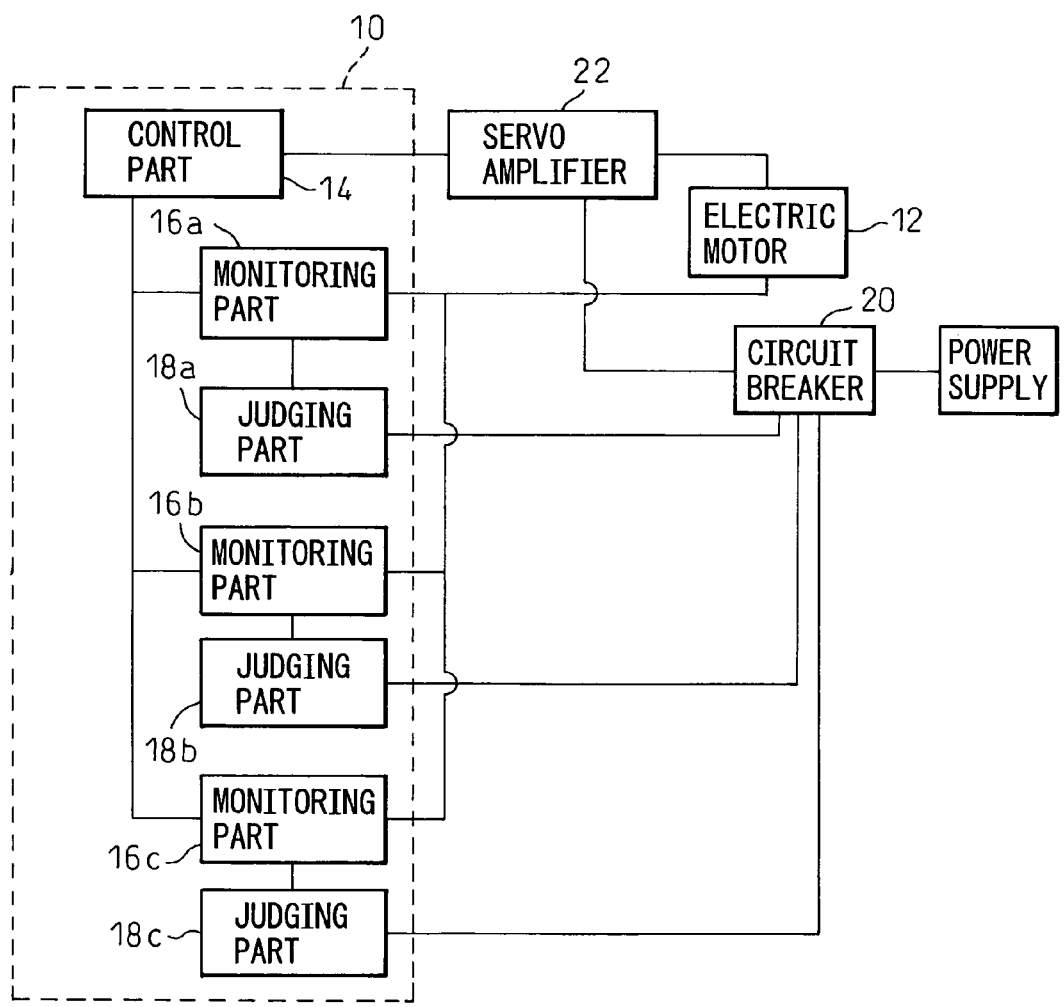
FIG. 9 is a view showing an example of application of a configuration of a control device according to the invention.

FIG. 9 is a view showing an example of application of a configuration of a control device according to the invention. The control device of FIG. 9 is different from the control device of FIG. 3, in that the control device includes a plurality of (three in this example) monitoring parts 16a-16c and a plurality of judging parts each associated with each monitoring part 18a-18c. In this case, even when at least one of the judging parts 18a-18c judges that the velocity of the motor is abnormal, the circuit breaker 20 is activated. Due to this constitution, if one of the monitoring parts or the judging parts is out of order, other judging parts may judge the velocity of the motor. Therefore, an abnormal velocity of the motor or a problem with the decelerating operation may be quickly and surely recognized.

The major object of the invention is to provide a control device capable of reducing stopping time of an electric motor, and the stopping distance of a movable part driven by the motor, when a decelerating operation for the motor includes some kind of problem, in comparison with the case in which the power to the motor is forcibly cut off. Therefore, it is preferable that the monitoring part and the judging part of the control device may be activated only in an emergency stop of the motor. For example, the monitoring part and the judging part are configured to be activated by an emergency stop signal outputted when an operator pushes an emergency stop button or another sensor detects a problem.

According to the control device of the present invention, during the decelerating operation of the electric motor, the velocity of the motor may be controlled when the decelerating operation is normal, otherwise, the power to the motor may be forcibly cut off when the decelerating operation is out of order. Therefore, the stopping time and the stopping distance of the motor may be reduced, while the risk of runaway of the motor is eliminated.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A control device of an electrical motor, comprising:
   a control part for controlling decelerating and stopping operations of the electrical motor;
   a monitoring part configured to be activated by an emergency stop signal, for monitoring the operations of the electric motor; and
   a judging part configured to be activated by the emergency stop signal, for judging whether a velocity of the electric motor monitored by the monitoring part is abnormal, wherein
   the control part continues controlling the decelerating and stopping operation of the electric motor while the judging part judges that the velocity of the electric motor is normal, and
   the judging part forcibly cuts off power to the electric motor via a circuit breaker when the judging part judges that the velocity of the motor is abnormal.

2. The control device as set forth in claim 1, wherein the monitoring part monitors the velocity of the electric motor at a predetermined interval while the motor is decelerating and the judging part judges that the velocity is abnormal when the velocity monitored by the monitoring part is not continuously decreased.

3. The control device as set forth in claim 1, wherein the monitoring part monitors the velocity of the electric motor after a predetermined time is passed from the beginning of deceleration of the motor and the judging part judges that the velocity is abnormal when the velocity monitored by the monitoring part is equal to or larger than a predetermined threshold.

4. The control device as set forth in claim 1, wherein
   the monitoring part monitors the velocity of the electric motor at a predetermined interval while the motor is decelerating, and
   the judging part judges whether the velocity is abnormal, or not, based on a result of comparison between the velocity monitored by the monitoring part and a commanded velocity calculated at a predetermined interval for the motor.

5. The control device as set forth in claim 1, wherein the control device includes a plurality of the monitoring parts and a plurality of the judging parts each associated with each monitoring part and at least one of the judging parts forcibly cuts off power to the electric motor via the circuit breaker when the judging part judges that the velocity of the motor is abnormal.

6. A method of controlling an electrical motor, comprising:
   controlling decelerating and stopping operations of the electric motor;
   monitoring velocity of the electric motor during the decelerating and stopping operations of the electric motor, when an emergency stop signal is outputted;
   judging whether the monitored velocity of the electric motor is abnormal, when the emergency stop signal is outputted, while the decelerating and stopping operations of the electric motor are controlled;
   continuously controlling the decelerating and stopping operations of the electric motor while the velocity of the electric motor is judged to be normal; and
   forcibly cutting off power to the electric motor when the velocity of the electric motor is abnormal.

* * * * *